United States Patent
Furey et al.

(10) Patent No.: US 11,892,323 B1
(45) Date of Patent: *Feb. 6, 2024

(54) UNIVERSAL SENSOR FITTING FOR PROCESS APPLICATIONS

(71) Applicant: PendoTECH, Plainsboro, NJ (US)

(72) Inventors: James F. Furey, Plainsboro, NJ (US); Dustin James Rekow, Fort Collins, CO (US)

(73) Assignee: PendoTECH, Plainsboro, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,929

(22) Filed: Jul. 17, 2023

Related U.S. Application Data

(60) Continuation of application No. 17/379,283, filed on Jul. 19, 2021, which is a continuation of application No. 16/272,491, filed on Feb. 11, 2019, now Pat. No. 11,099,040, which is a continuation of application No. 15/040,609, filed on Feb. 10, 2016, now Pat. No. 10,215,598, which is a division of application No. 13/651,950, filed on Oct. 15, 2012, now Pat. No. 9,285,250, which is a division of application No. 12/981,959, filed on Dec. 30, 2010, now Pat. No. 8,302,496, which is a continuation-in-part of application No. 11/757,981, filed on Jun. 4, 2007, now Pat. No. 7,861,608.

(60) Provisional application No. 60/810,464, filed on Jun. 3, 2006.

(51) Int. Cl.
*G01D 11/24* (2006.01)
*G01D 11/30* (2006.01)

(52) U.S. Cl.
CPC .......... *G01D 11/30* (2013.01); *G01D 11/245* (2013.01)

(58) Field of Classification Search
CPC ............................. G01D 11/30; G01D 11/245
USPC ............... 73/866.5, 861.42, 861.47, 861.48, 73/861.52–861.64, 273
See application file for complete search history.

(56) References Cited

U.S. PATENT DOCUMENTS

| | | | |
|---|---|---|---|
| 3,248,946 A | 5/1966 | Lichtenberg et al. | |
| 3,418,853 A * | 12/1968 | Curtis | A61M 1/3639 |
| | | | 73/730 |
| 3,589,192 A | 6/1971 | Sabovik | |
| 3,691,846 A * | 9/1972 | Ingold | G01N 27/283 |
| | | | 73/866.5 |
| 4,539,998 A | 9/1985 | McCord et al. | |
| 4,576,181 A | 3/1986 | Wallace et al. | |

(Continued)

FOREIGN PATENT DOCUMENTS

EP     0079086 A1    5/1983

*Primary Examiner* — Robert R Raevis
(74) *Attorney, Agent, or Firm* — Quarles & Brady LLP

(57) ABSTRACT

A universal fitting for in-line fluid measurement in a process application. The fitting includes an inlet and outlet port and also has a body with a fluid flow passage providing fluid communication between the ports. A sensor housing is provided that extends outwardly away from a wall of the body, wherein the housing is sized to receive a sensor assembly, which assembly measures at least one characteristic of the fluid. A base of each housing integrally formed with the wall and including a sensor seat for receiving a portion of the sensor assembly. A probe aperture receives a probe portion of the sensor assembly, each housing having the probe aperture disposed in the wall and extending from the fluid passage through its respective sensor seat.

39 Claims, 5 Drawing Sheets

(56) References Cited

U.S. PATENT DOCUMENTS

| | | | |
|---|---|---|---|
| 4,583,499 A | 4/1986 | Hovey | |
| 4,610,256 A | 9/1986 | Wallace | |
| 4,658,829 A | 4/1987 | Wallace | |
| 4,662,210 A | 5/1987 | D'Aoust | |
| 4,679,567 A | 7/1987 | Hanlon et al. | |
| 4,785,822 A | 11/1988 | Wallace | |
| 4,824,148 A | 4/1989 | Grabowski | |
| 4,825,876 A * | 5/1989 | Beard | G01L 19/0084 |
| | | | 439/930 |
| 4,873,986 A | 10/1989 | Wallace | |
| 4,966,161 A | 10/1990 | Wallace et al. | |
| 5,021,046 A | 6/1991 | Wallace | |
| 5,042,495 A | 8/1991 | Spotts et al. | |
| 5,083,427 A | 1/1992 | Anderson | |
| 5,097,841 A | 3/1992 | Moriuchi et al. | |
| 5,281,331 A | 1/1994 | Golan | |
| 5,385,613 A | 1/1995 | Coleman | |
| 5,526,287 A | 6/1996 | French | |
| 5,540,100 A | 7/1996 | von Berg | |
| 5,656,771 A | 8/1997 | Beswick et al. | |
| 5,672,832 A * | 9/1997 | Cucci | G01F 1/44 |
| | | | 73/861.47 |
| 5,711,302 A | 1/1998 | Lampropoulos et al. | |
| 5,731,527 A * | 3/1998 | Van Cleve | G01F 1/8477 |
| | | | 138/DIG. 2 |
| 5,821,405 A | 10/1998 | Dickey et al. | |
| 5,889,212 A | 3/1999 | Guthrie et al. | |
| 6,053,031 A | 4/2000 | Kullik et al. | |
| 6,272,930 B1 | 8/2001 | Crozafon et al. | |
| 6,409,909 B1 | 6/2002 | Spichiger-Keller et al. | |
| 6,471,395 B1 | 10/2002 | Buhl et al. | |
| 6,536,273 B2 | 3/2003 | Schrittenlacher | |
| 6,667,600 B2 | 12/2003 | Fogleman | |
| 6,722,120 B2 | 4/2004 | Plote | |
| 6,789,418 B2 | 9/2004 | Uramachi et al. | |
| 6,852,216 B2 | 2/2005 | Moscaritolo et al. | |
| 6,938,506 B2 | 9/2005 | Henry et al. | |
| 6,964,204 B2 | 11/2005 | Clark et al. | |
| 6,969,413 B2 | 11/2005 | Yahata et al. | |
| 6,988,361 B2 | 1/2006 | van Nieuwstadt et al. | |
| 7,080,559 B1 | 7/2006 | Griffin et al. | |
| 7,082,843 B2 | 8/2006 | Clark et al. | |
| 7,138,926 B2 | 11/2006 | Henry et al. | |
| 7,171,857 B2 | 2/2007 | Barron | |
| 7,237,948 B2 | 7/2007 | Nakabayashi | |
| 7,434,470 B2 | 10/2008 | Engelhardt et al. | |
| 7,861,608 B2 | 1/2011 | Furey et al. | |
| 8,182,143 B2 | 5/2012 | Fleming et al. | |
| 8,302,496 B2 * | 11/2012 | Furey | G01D 11/245 |
| | | | 73/866.5 |
| 8,466,523 B2 | 6/2013 | Chiou | |
| 8,468,895 B2 | 6/2013 | Colombo et al. | |
| 9,285,250 B2 * | 3/2016 | Furey | G01D 11/30 |
| 10,215,598 B2 * | 2/2019 | Furey | G01D 11/30 |
| 11,099,040 B2 * | 8/2021 | Furey | G01D 11/30 |
| 2003/0226405 A1 | 12/2003 | Bell | |
| 2004/0190590 A1 | 9/2004 | Wienand et al. | |
| 2005/0072253 A1 | 4/2005 | Scott et al. | |
| 2005/0155408 A1 | 7/2005 | Weyl et al. | |
| 2005/0175066 A1 | 8/2005 | Nakabayashi | |
| 2005/0223829 A1 * | 10/2005 | Mayeaux | G01N 17/046 |
| | | | 73/866.5 |
| 2005/0224125 A1 * | 10/2005 | Kajino | F16L 23/14 |
| | | | 138/119 |
| 2005/0257605 A1 | 11/2005 | Colvin et al. | |
| 2005/0284236 A1 | 12/2005 | Kielb et al. | |
| 2006/0037408 A1 | 2/2006 | Peter | |
| 2006/0112771 A1 | 6/2006 | Mizohata | |
| 2006/0112773 A1 | 6/2006 | Hedtke | |
| 2007/0058690 A1 | 3/2007 | Feldmeier | |
| 2007/0204927 A1 * | 9/2007 | Yamashita | F16L 55/04 |
| | | | 62/529 |
| 2011/0061757 A1 * | 3/2011 | Butler | F16L 55/02709 |
| | | | 138/40 |

* cited by examiner

UNIVERSAL SENSOR FITTING FOR PROCESS APPLICATIONS

CROSS-REFERENCE TO RELATED APPLICATIONS

The present application is a continuation application of U.S. application Ser. No. 17/379,283, filed Jul. 19, 2021, which is a continuation application of U.S. application Ser. No. 16/272,491, filed Feb. 11, 2019, which is continuation application of U.S. application Ser. No. 15/040,609, filed Feb. 10, 2016, which is a divisional application of U.S. application Ser. No. 13/651,950, filed Oct. 15, 2012, now U.S. Pat. No. 9,285,250, which is a divisional application of U.S. application Ser. No. 12/981,959, filed Dec. 30, 2010, now U.S. Pat. No. 8,302,496, which is a continuation-in-part of U.S. application Ser. No. 11/757,981, filed Jun. 4, 2007, now U.S. Pat. No. 7,861,608, which claims priority to provisional patent Application Ser. No. 60/810,464, filed Jun. 3, 2006. These earlier filed applications are incorporated herein by reference in their entirety for all purposes.

BACKGROUND

Process applications generally involve a series of actions or steps that are taken in a prescribed sequence in the development and/or manufacturing of a product. Such processes are repeatable and predictable, or at least are generally intended to be. In a wide range of fluid handling process applications knowledge of process pressure or other fluid characteristics is a valuable piece of information. Such measurements are of particular interest in the technology field of biopharmaceutical process applications for both product development and manufacturing. For example, in order to measure pressure in a fluid stream or vessel, a pressure gauge is traditionally used. In some automated systems, a stainless steel pressure measurement device with an integral transmitter is also common. However, the use of an in-line gauge or stainless steel pressure transmitter it not optimal in some process applications, such as when using lightweight flexible tubing, such in-line devices can be bulky, weighty or too intrusive.

Additionally, many fluid process applications in biotechnology and chemistry require fluid handling environment with minimal microbial contamination. It is important to ensure that an uncontaminated environment has been maintained throughout the process. Thus, in critical processes, such as production in bioreactors, filtration, and chromatography, knowledge of the fluid pressure in the process is critical, but an uncontaminated environment must be maintained.

One method of maintaining an uncontaminated environment is to employ critical assembly elements that are designed for single-use (or limited use). Thus, in such an assembly the flow path could contain a large variety of components such as single use process containers (plastic/polymeric containers/bags), tubing, filters, and connectors. Frequently, peristaltic tubing pumps where the pump parts only contact the outside of process tubing but does not touch the fluid stream are used for different processes. Furthermore a single use flow path can be delivered to an end-user assembled and even gamma-irradiated or sterilized by other means such as chemical sterilization. However, if sterilization is required, many single-use process components are not compatible with moist heat sterilization temperatures so there may be requirement for separate sterilization of the process sensors such as a stainless steel pressure transmitter device and possibly non-optimal connection to a pre-sterilized disposable assembly. Even if the process is only sanitary (not sterile) and tubing is to be utilized in the process and the tubing inner diameter (ID) is small, it can be cumbersome to connect a pressure measurement device with a sanitary fitting flange(s) to a process stream. Also, even if only sanitary, critical cleaning would be required of all product contacts parts of a process sensor such as a pressure a measurement device and associated fittings used to connect it to the process.

It is therefore desirable to provide an apparatus and/or system that is suitable to maintain an environment with minimal microbial contamination, while providing the ability to measure pressure and other characteristics of the fluid itself. Also, the apparatus and/or system must be easy to use, inexpensive and universally adaptable to numerous applications.

SUMMARY

One aspect of the present invention relates to a universal fitting for in-line fluid measurement in a process application. The fitting includes an inlet and outlet port. The fitting also has a body with a fluid flow passage providing fluid communication between the ports. A sensor housing is provided that extends outwardly away from a wall of the body, wherein the housing is sized to receive a sensor assembly, which assembly measures at least one characteristic of the fluid. A base of each housing integrally formed with the wall and including a sensor seat for receiving a portion of the sensor assembly. A probe aperture receives a probe portion of the sensor assembly, each housing having the probe aperture disposed in the wall and extending from the fluid passage through its respective sensor seat.

Another aspect of the present invention relates to a universal fitting for in-line fluid measurement in a process application. The fitting includes an inlet and outlet port for in-line coupling to the process application. Also, a fluid flow passage provides fluid communication between the ports. At least one sensor housing extends outwardly away from a wall of the fluid passage. Also, the housing is sized to receive a sensor assembly which assembly measures at least one characteristic of the fluid. A base of the housing is integrally formed with the wall and includes a sensor seat for receiving a portion of the sensor assembly. Further, at least one probe aperture is provided for receiving a probe portion of the sensor assembly. The probe aperture is disposed in the wall of the fluid passage and extends from the fluid passage through the sensor seat into the housing.

Additionally, at least a portion of the housing can be formed to maintain a unique mounting orientation between the sensor assembly and the fluid passage, when the sensor assembly is inserted in the housing. Also, the sensor seat can be formed by a depression in an outer portion of the fluid passage wall. Further, the fluid passage can have a substantially constant cross-section between the inlet and outlet ports. Further still, an outer portion of the fluid passage wall can include at least one hose barb or threaded portion for maintaining a coupling between the fitting and the process application.

The fitting can further include an annular flange for limiting a length of application process tubing that can be directly mounted on the fitting, the flange protruding radially from the an outer portion of the fluid passage wall. Also, at least a portion of the annular flange can form a portion of the housing. Further, the at least one sensor housing can include at least two sensor housings. Further, the at least one sensor housing can include at least two sensor housings. Further still, the at least two sensor housings can be disposed in series and/or in parallel relative to the fluid flow passage. Additionally, an outer portion of the fluid passage wall can include a hose barb, threading, port plate and/or sanitary flange coupling structure for maintaining a coupling between the fitting and the process application.

Another aspect of the present invention relates to a universal fitting including a port, a fluid flow passage, a sensor housing, a sensor assembly and a probe aperture. The port is for coupling to the process application. The fluid flow passage is in open communication with the port. The sensor housing is integrally formed with and extends outwardly away from a wall of the fluid passage. Also, a portion of the housing includes a sensor seat. The sensor assembly measures at least one characteristic of the fluid. Also, the sensor assembly includes at least one fluid probe. Additionally, the sensor assembly is sized to be at least partially inserted into the sensor seat, wherein the probe is exposed to the fluid when so seated. Further, the probe aperture receives the sensor probe. Also, the probe aperture is disposed in the wall of the fluid passage and extends from the fluid passage through the sensor seat into the housing.

Additionally, the sensor seat can be formed by a depression in an outer portion of the fluid passage wall. Also, the measured fluid characteristic can include at least one of fluid pressure, temperature and flow rate. Further, the measured fluid characteristic can also include at least one of fluid pH, dissolved oxygen, absorption, capacitance, conductivity and turbidity. The fitting can further include a housing cap for substantially enclosing the sensor assembly. The cap can be sized to matingly secure to the housing. Also, the housing cap can secure the sensor assembly relative to the housing. Additionally, the housing can substantially enclose and stabilize the sensor assembly. Further, the sensor assembly can provide real-time measurements of the fluid characteristic.

These and other objectives, features, and advantages of this invention will become apparent from the following detailed description of illustrative embodiments thereof, which is to be read in connection with the accompanying drawings.

DETAILED DESCRIPTION

Figure 1:
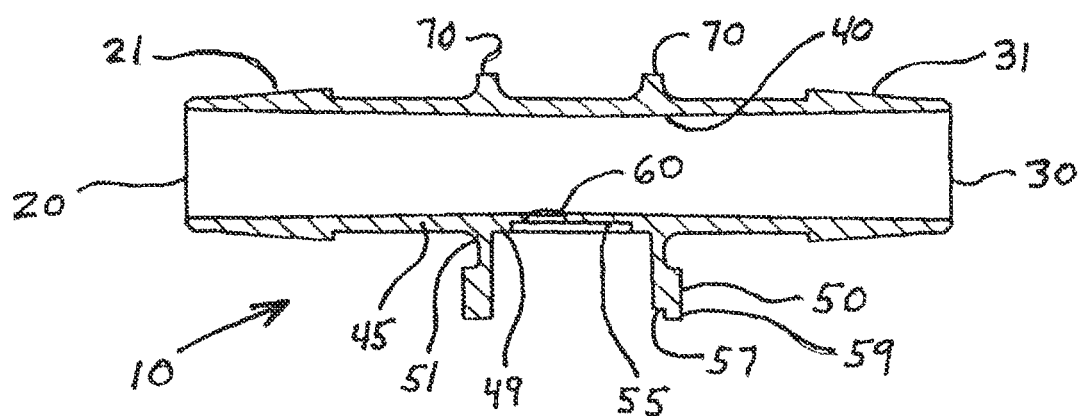
FIG. 1 is a cross-sectional view of an embodiment of a universal fitting in accordance with the subject invention.

With reference to the drawings, FIG. 1 shows a fitting 10 in accordance with the present invention that is easily integrated in-line to most fluid process applications. Preferably the fitting 10 is made of lightweight plastic, however other materials can be used that suit a particular application. For example, the fitting 10 can be made of parts that are compatible with both gamma radiation (using doses high enough for sterilization of process assemblies used in the industry, i.e, up to 45 KGy) or chemical sterilization (such as ethylene oxide (ETO)). While the fitting body 45 is shown to be a particular thickness, it should be understood that the thickness, color, opacity or other such features could be modified as would be known by one in the art. The universal fitting of the present invention could be easily integrated to a process application fluid path by attaching it to existing tubing or other common process conduits or containers.

The fitting 10 includes inlet 20 and outlet 30 ports for coupling to the process. The central fitting body 45 includes a fluid flow passage 40, which allows fluid to communicate or flow from the inlet 20 to the outlet 30. The inner diameter (ID) of the fluid flow passage 40 can be formed to numerous dimensions and adapted for specific application requirements. The ID can potentially be formed and sold in different size ranges, incrementing for example by $\frac{1}{16}$ of an inch to 1 inch or larger.

Additionally, the fitting 10 includes a sensor housing 50, which is preferably integrally formed with the rest of the fitting body. The sensor housing 50 is sized to receive at least a portion of a sensor assembly (not shown) associated with a probe or other means of measuring one or more fluid characteristics. The housing 50 includes a sensor seat 55 for receiving and preferably engaging a portion of the sensor assembly. Also, a probe aperture 60 is located in the housing 50, and preferably penetrates the fitting body through the sensor seat 55. The aperture 60 passes through an outer wall of the central fitting body, thereby coupling an inner chamber 80 of the housing 50 with the fluid flow passage 40. A bottom view of alternative fittings having similar housing 50, sensor seat 55 and aperture 60 configurations is shown in FIGS. 4-10, discussed more fully below.

Figure 2:
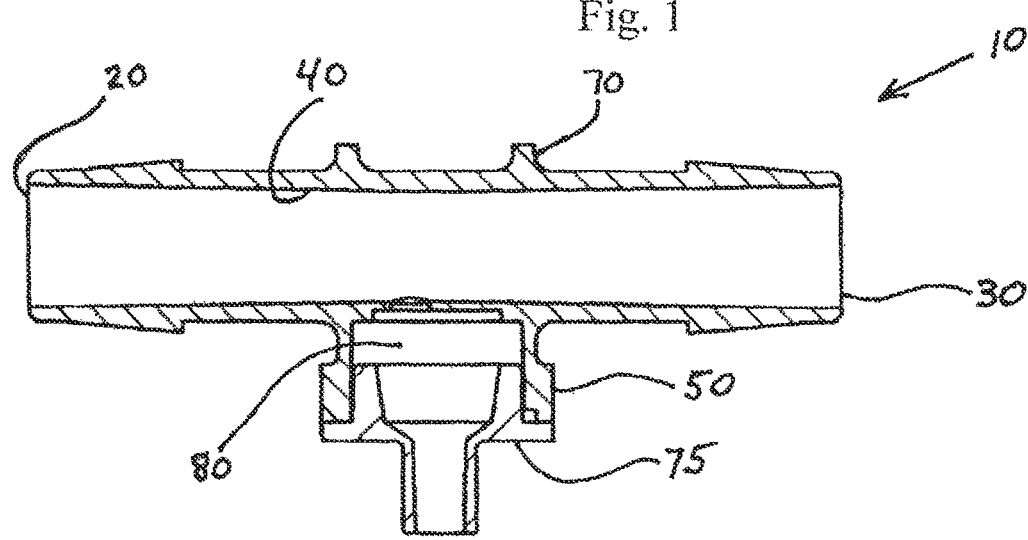
FIG. 2 is a cross-sectional view of the universal fitting of FIG. 1, with a sensor assembly cap secured to the sensor housing, in accordance with the subject invention.
Figure 3:
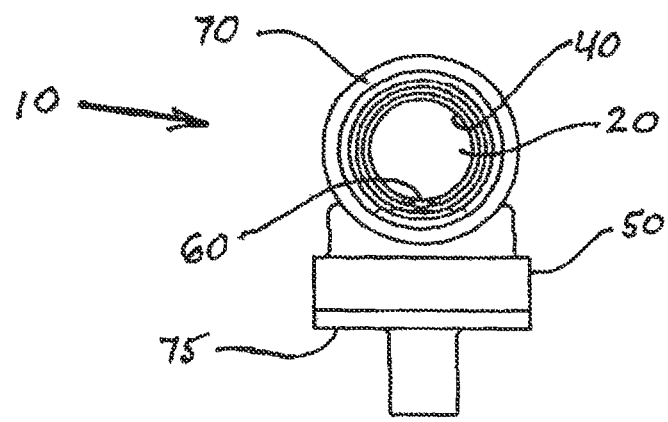
FIG. 3 is a side view of the universal fitting and sensor assembly cap shown in FIG. 2.
Figure 7:
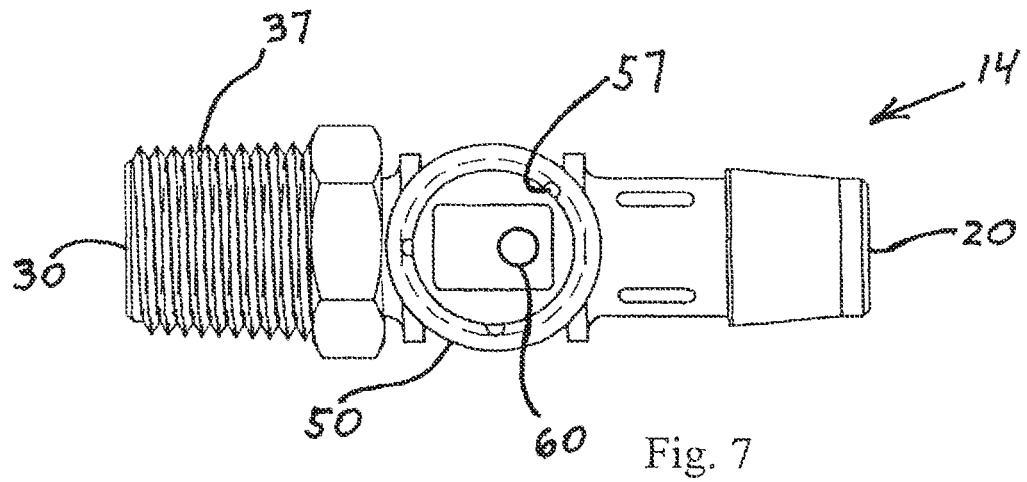
FIG. 7 is a bottom view of yet another alternative embodiment of the universal fitting, in accordance with the subject invention.

FIGS. 2 and 3 show the fitting 10 with a sensor assembly cap 75 secured to the sensor housing 50. The sensor housing 50 is formed to protrude from a portion of the fitting body outer wall 49. A base portion 51 of the housing 50 proximal to the fluid passage 40 is preferably integrally formed with the central fitting body 45. The opposite end of the housing 59 is preferably open for receiving the sensor assembly and cap 75. An alignment groove 57, as also shown in FIG. 7, can also be provided to ensure a unique orientation between the fitting 10 and the sensor cap 75.

Figure 12:
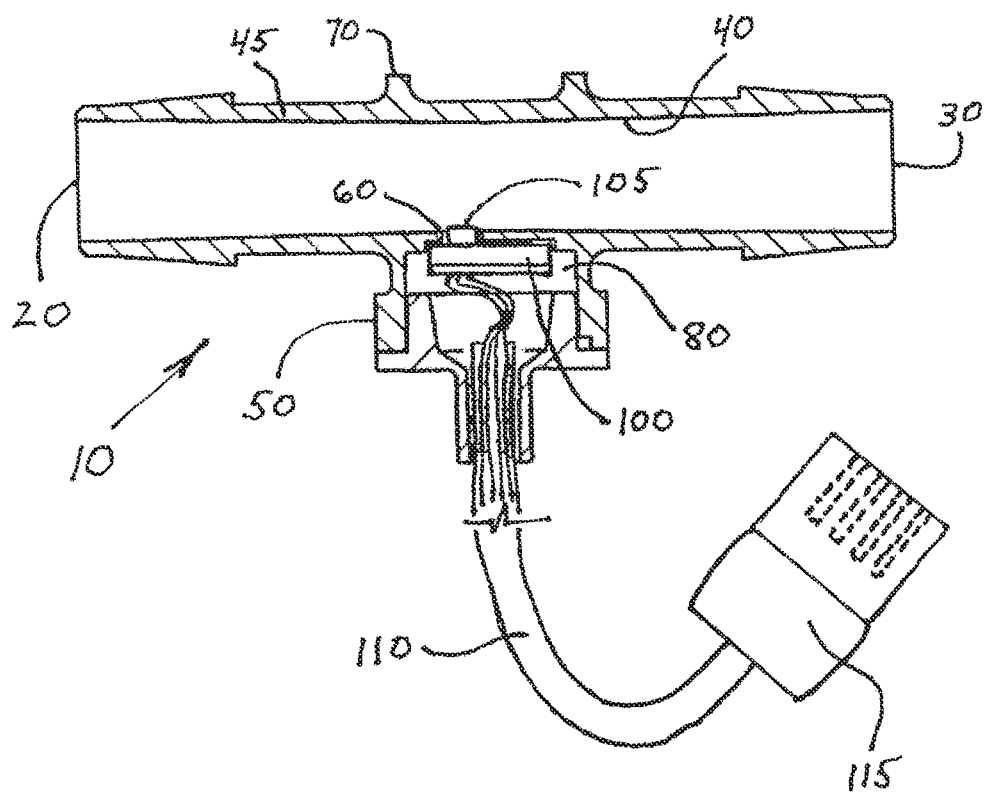
FIG. 12 is a partial cross-sectional view of the universal fitting of FIG. 1, with a sensor assembly and cap secured to the sensor housing, in accordance with the subject invention.

A sensor assembly is preferably contained within the inner chamber 80 of the housing 50 and covered by the cap 75. Wiring (an example of which is shown in FIG. 12) can then extend from the sensor assembly enclosed in the housing 50 to a controller, power source or other sensor assembly elements remote from the fitting 10. In addition to pressure, it is often desirable to measure many other fluid characteristics, such as flow rate, pH, dissolved oxygen, temperature, conductivity, clarity, absorption (using spectroscopy, laser or fiber optic techniques), capacitance or turbidity. Thus, in accordance with the present invention, the housing 50 is universally adapted to contain a select sensor for at least one of these measurements. Also, by providing more than one housing 50 in a single fitting, multiple fluid characteristics can potentially be measured together.

Microelectromechanical Systems (MEMS) is the technology of the very small. Currently, numerous MEMS sensors on a chip are available that have only a small surface that is required to be in direct or indirect contact with the process (for example a 1 mm diameter surface) could be mounted in the aperture 60 between the fluid passage 40 and the housing 50 to measure the fluid. While the sensor sits in the aperture 60, the microprocessor chip controlling the sensor preferably sits in the adjacent sensor seat 55 and/or the housing 50. For example, there exist pressure sensors that meet such criterion, that employ a silicone diaphragm in a wheatstone bridge circuit and the applied voltage to the circuit gives a voltage output directly proportional to pressure. A further example of such sensors includes the "NPC-100 Series Disposable Medical Pressure Sensor," manufactured by General Electric®.

Figure 9:
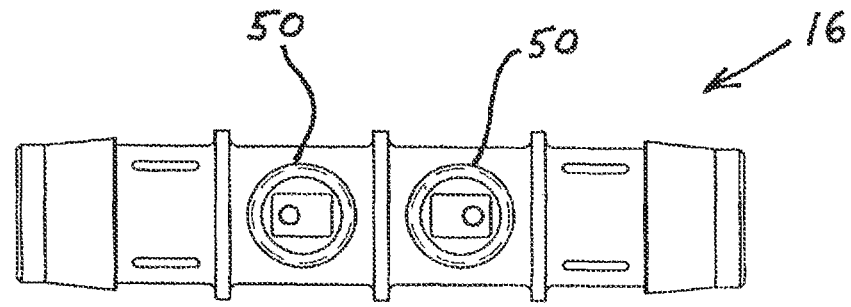
FIG. 9 is a bottom view of another alternative embodiment of the universal fitting with more than one sensor housing, in accordance with the subject invention.

Alternatively, the flow rate can be measured by using two MEMS pressure chips, taking advantage of the change in pressure across the space between the sensors. This might require a larger aperture 60, or perhaps two apertures, as shown in FIG. 9. However, flow can also be measured using vortex flow measurement devices in the form of a MEMS chip. Similarly, conductivity is generally the measurement of the conductance between two metal probes, placed a short distance apart, typically 1 cm. Thus, once again a dual aperture 60 configuration is desirable. If the spacing between probes or more or less than the 1 cm, the distance is generally normalized back to 1 cm. However, conductivity also requires temperature to be measured, to correlate the measurement back to 25° C., which then demands one or two additional aperture 60/housing 50. Temperature can be measured by thermistor, thermocouple or an RTD. Alternatively, one sensor housing could be used to measure conductivity or other characteristics, using a sensor aperture sized to fit the desired sensing elements. For example, a conductivity sensor and a temperature sensor can be incorporated into a surface coating of a substrate and made small enough to be seated together in a single sensor aperture. Such small sensors, particularly ones having sensing surfaces smaller than 1 cm, can be accommodated in relatively small sensor apertures. However, it should be understood that larger sensors could be used, as long as the sensor aperture is appropriately sized for it.

Other micro-sensors are available which can measure pH or dissolved oxygen through the use of optical fluorescing membranes (in the form of a dot) placed into a compartment. One side of the dot contacts the fluid and a detector is placed on the other side (away form fluid contact). The detector measures fluorescence via fiber optic cable and that correlates the light to pH or dissolved oxygen concentration. It should be noted that a-rings or other supplemental securing elements can also be used, particularly with these types of systems, to ensure a proper seal, alignment and orientation, as well as to keep the sensor in place. A seal can be maintained within the aperture 60 and/or between the sensor seat 55 and the portion of the sensor assembly engaged thereon. Such a seal could be provided by adhesives, chemical bonding, ultrasonic welding, a-rings, gaskets and other known means.

Further, optical fiber sensors are useful for measurements through spectroscopy. The fiber is inserted into the aperture 60 and a light shown into the fluid. The opposite side of the fluid path can either include a reflective surface, such as a mirror, or can include a photo-detector. The path length of the light from the fiber(s) to the detector must generally be known for proper measurements to be accurate. Similarly, spectroscopy can be used for turbidity measurements.

Thus, whether using MEMS chips, probes or fiber optics, by placing the sensor in the housing 50, different inlet 20 and outlet 30 sizes can be readily used to optimize adaptation to the process based on process requirements and there can even be a T- or a Y-junction, not limited to just one inlet/one outlet, reducer fitting, and an elbow fitting. By using one size/diameter housing part for many different inlet and outlet combinations, the user can use the subject fitting in place of an existing fitting. In this way, the fittings of the present invention can be used in place of a traditional in-line coupling or transition fitting. The present invention can provide the optional capability to take one or more measurements at the fitting location. Also, incorporating the sensor housing of the present invention into a fitting with various inlet and outlet configurations, provides flexibility and can reduce costs by avoiding custom tooling and/or molds.

A cap is preferably placed on the end 59 of the housing 50 to cover the sensor assembly and any wires, cables or tethers required to control or power the sensor, or carry a signal to/from the sensor mounted in the housing 50. The housing 50 and cap 75 can guide the cable away or toward the fitting. Alternatively, the cap 75 can be used to secure and/or stabilize the sensor assembly, either alone or in combination with further interior housing supports. Also, to housing 50 can be notched 57 in specific locations to limit and/or guide the orientation of the cap 75 and/or the wiring. Also, the cap 75 can be permanently secured to the housing 50, such as through chemical bonding or a one-way snap-fit union. However, less permanent fastening techniques can be employed, such as a mating threading or other coupling between the housing 50 and the cap 75. A removable cap 75 might be reusable, while a permanently secured one would more likely be intended for single or limited-use along with the rest of the fitting 11. The mounting between the housing 50 and the cap 75 may need to be sealed, depending on whether a seal is not already provided around the aperture 60 or between the sensor seat 55 and the sensor assembly seated therein. For a removable cap 75, a seal can be provided by a gasket, a-ring or other known means. A permanently secured cap 75 can be chemically bonded, ultrasonic welding or other known means.

As shown, the outer walls adjacent the ports 20, 30 are preferably formed as hose barbs 21, 31, for easily coupling with flexible tubing. Additionally, as shown in FIGS. 4-10, ribs 47 can be provided on the outer surface of the fitting, just behind the hose barb for improved engagement between the fitting 10 and the attached tubing. Alternatively, the outer port walls could be threaded, or the ports could be provided with a combination of one be threaded and the other having hose barbs. The fitting 10 is also preferably provided with radially extending flanges 70, which are also integrally formed with the housing 50. The flanges 70 are suitable as stops or limits for how far the process tubing (not shown) can be mounted onto the fitting.

As shown in FIGS. 4-10, the sensor housing 50 preferably has a circular cross-section, while the sensor seat 55 preferably has a rectangular cross-section. The sensor seat 55 is also preferably formed as a recess or depression in the outer wall central portion 49. The rectangular shape of the sensor seat 55, along with the offset (non-centered) position of aperture 60 provide a mechanism for ensuring the sensor is installed in a predictable position relative to the fitting 10. Nonetheless, such features could be removed or altered to suit the application. For example, other shapes and proportions could be used for the housing 50, seat 55 or even the aperture 60. Additionally, the housing 50 and/or aperture 60 could alternatively be provided with inner threading for threaded engagement with the sensor portions inserted therein. Additionally, the inner walls of housing 50 could alternatively be grooved or shaped to mate with, stabilize and/or secure a portion of the sensor assembly.

Figure 4:
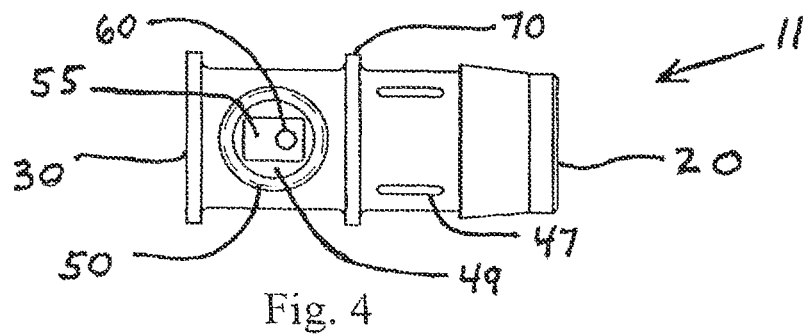
FIG. 4 is a bottom view of an alternative embodiment of the universal fitting, in accordance with the subject invention.
Figure 5:
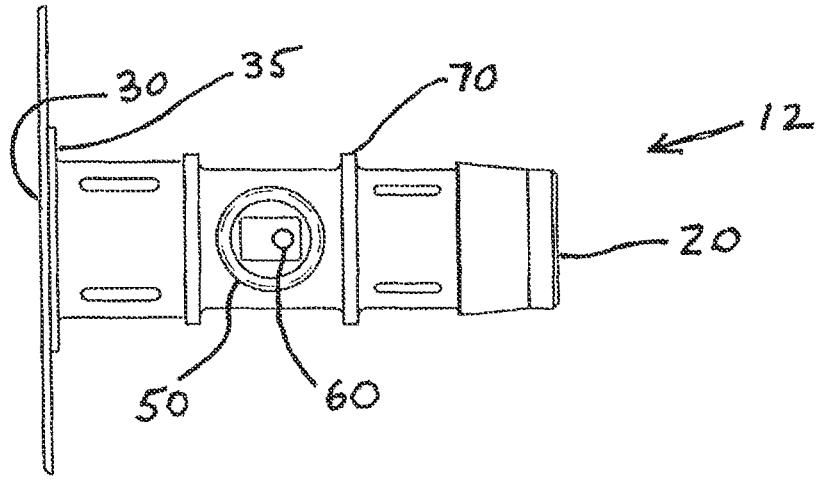
FIG. 5 is a bottom view of another alternative embodiment of the universal fitting, in accordance with the subject invention.
Figure 6:
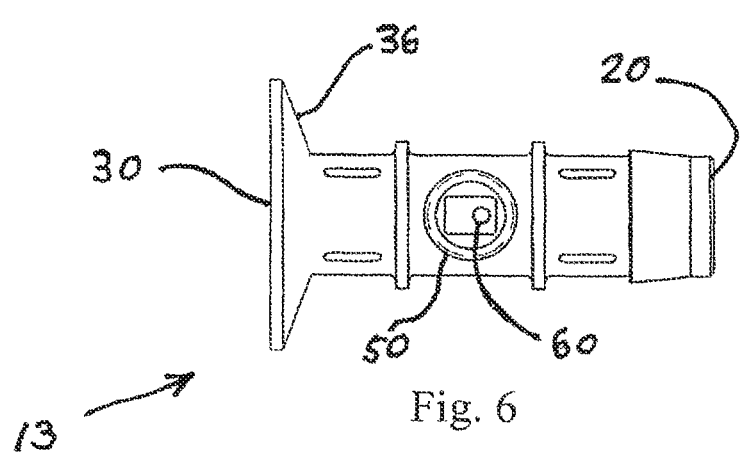
FIG. 6 is a bottom view of yet another alternative embodiment of the universal fitting, in accordance with the subject invention.
Figure 8:
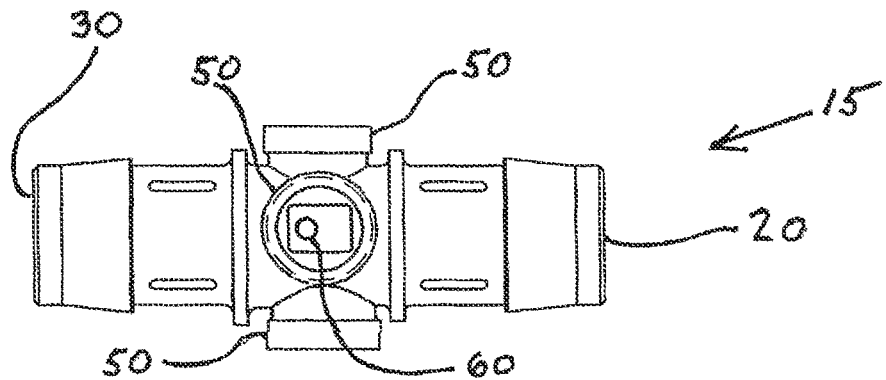
FIG. 8 is a bottom view of an alternative embodiment of the universal fitting with more than one sensor housing, in accordance with the subject invention.

Specifically, FIG. 4 shows fitting 11, with a blank on one port 30 and a hose barb on the other port 20. Such a blank could be used to measure static pressure on a piece of tube such as measuring the liquid pressure head in a system. FIG. 5 includes a fitting 12 with a port plate 35 that secures to a bag or container at port 30. As shown in FIG. 5, fitting 12 can be integrated into or onto a bag port of a process application bag or container. Thus, the fitting 12 can be used to directly measure pressure at the bag port 30. The hose barb port 20 on the other side can be used to connect tubing to the bag or container. In other words, fluid flowing into or out of the container can be measured. Alternatively by connecting a cap (not shown) on the opposite side 20 of the bag port 30, static fluid characteristics, such as pressure, pH, temperature, etc., can be measured in the container/bag. FIG. 6 shows a hose barb/sanitary flange 36 combination. FIG. 7 shows a hose barb/threading configuration. The threaded portion 37 of the fitting 14 can also be coupled to a matching female threading with a washer or other sealer to prevent leaks. Also, note that FIG. 7 illustrates the orienting grooves/ notches 57 in the housing 50. FIGS. 8 and 9 show fittings 15, 16 that include more than one housing 50. It should be noted that in such multi-housing configurations, extra housing portions 50, that are not used (i.e., filled with a sensor assembly or a portion thereof) can be plugged or closed-off.

Figure 10:
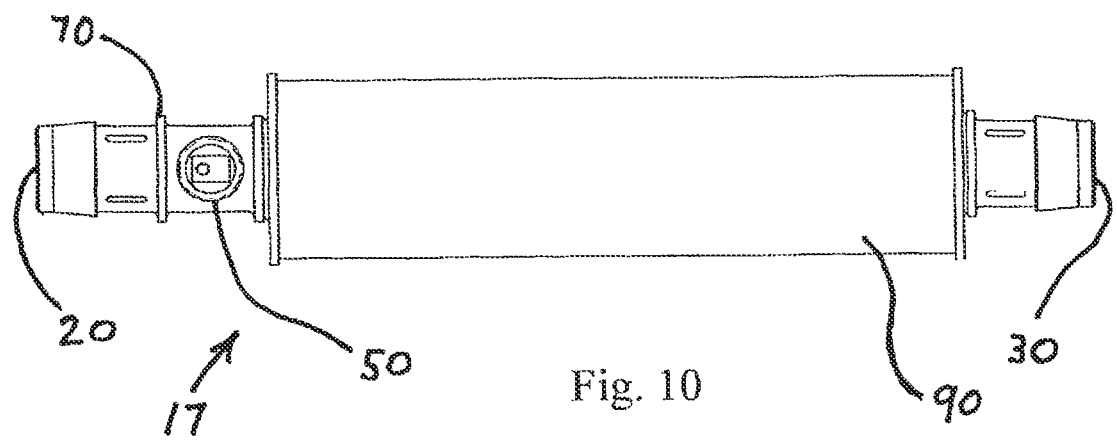
FIG. 10 is a bottom view of another alternative of the universal fitting with a filter included in the fitting, in accordance with the subject invention.
Figure 11:
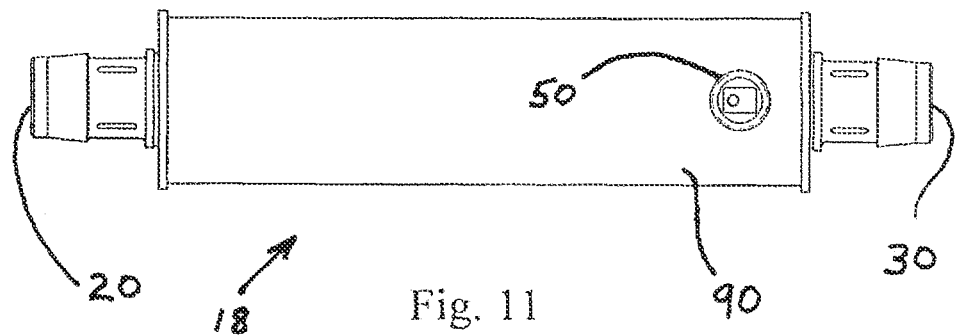
FIG. 11 is a bottom view of a further alternative of the universal fitting with a filter included in the fitting, in accordance with the subject invention.

FIGS. 10 and 11 show fittings 17, 18 that include an in-line filter 90. It should be understood that filter 90 could alternatively be a T-line, cross-flow or other form of filter. FIG. 10 includes a sensor housing 50 closer to one of the two ports, namely port 20, but alternatively a second sensor housing could be provided on the other side of the filter 90 as well. FIG. 11 includes the sensor housing 50 disposed on the filter 90. It should be understood that the one or more sensor housings could be disposed almost anywhere on the filter 90. Also, multiple sensor housings could be provided with one or more on the filter and one or more off the filter.

It should be noted that while hose barbs, threaded fittings and some others coupling portions are described for the fittings, other options for the inlets 20/outlets 30 of the fitting could be used for interchangeability (such as sanitary fittings) and flexible tubing is mentioned but this invention could also be adapted to plastic and metal rigid piping. As a further alternative, luer fittings could be incorporated onto the outer region of the inlets 10 and outlets 20. However, luer fittings tend to require narrow flow paths, which can alter fluid flow characteristics or just impede the fluid flow. Also, luer adapters tend to loosen and/or leak when manipulated and are not always suited for industrial process operation.

FIG. 12, shows the universal fitting 10 and cap 75 of FIG. 2, with a sensor assembly 100 inserted within the housing 50. As described above, the sensor assembly 100 can measure numerous specific fluid characteristics. The particular assembly 100 shown in FIG. 12 is in the style of a MEMS chip sensor with a probe 105 inserted within the aperture 60. Also, the sensor assembly includes wires, cables or tether 110 that extend(s) to a coupling element 115. In this way the assembly can be linked to nearby monitoring equipment that might record and/or control the system. It should be understood that while a particular configuration of sensor assembly is shown, any one of the fluid measurement systems discussed above could preferably be incorporated to fit within the housing 50, in accordance with the present invention. In this way, fiber optic, RF transmitting/powered or other systems could be used.

Further, to determine reliability of placement of the sensor during manufacturing and overall integrity of the part, a leak test of the part that does not damage the fitting to later be used by the customer should be conducted. A rubber stopper (or other acceptable material), flat gasket or similar components could be placed into all inlets/outlets except one. They could be manually inserted or be mounted to a fixture. The part could be placed into a fixture that would hold the stopper like component in place if manually inserted, or the fixture would align the part to secure the stopper or flat gasket in place. An air line would come within the interior of another rubber stopper like component that would be inserted into the remaining inlet/outlet and this rubber stopper like component would be secured into place within the fixture. Air pressure could be then be applied to the part and either a gauge on the air line or the pressure sensor itself could measure pressure decay to indicate leaks when the air pressure was isolated on the part. Pressure up the highest acceptable values could be used and the values would depend on factors such as the part size, material, sensor mounting method, and sensor itself. With the same set-up a leak "sniffer" could be used if the part was pressurized with a gas such as helium or hydrogen to look for leaks. Another quality test could involve having a sensor housing design that would allow attachment of a hose or fixture without causing any wear or damage to the hose barb that will later be used by the customer.

Furthermore the fitting design of the present invention can be used for other sensors to gain access to many different process streams for analytical measurements with a similar circuit and even two pressure sensors could be used in a special center sensor mounting part design and be used as a differential mass and/or volumetric flow sensor.

In a preferred embodiment, the fittings 10-17 are designed as disposable units for single or very limited use. Thus, by providing an easily manufactured and low cost fitting along with only limited sensor elements that get contaminated by the process, the overall process costs can be reduced. Also, the light-weight fitting of the present invention, along with the minimal sensor elements held within the housing, have a small profile which can be more easily incorporated into existing process applications.

As mentioned earlier, the fittings described can be made from inexpensive plastic, ceramic or metal materials designed for single or limited use, such as those discussed in 1997 Association of the Advancement of Medical Instrumentation Technical Information Report designated— TIR17-1997 (hereinafter referred to as "AAMI 1997").

Thus, the fitting is preferably disposed or discarded after it has been contaminated during use as a fluid handling element. It should be noted that references herein to the term "disposable" or "single use" are to elements that are designed to be thrown away or discarded after a very limited number of uses and preferably used with a process only once. The universal fitting can be made or formed by machining, stamping, molding or other known techniques for forming such items.

As will be recognized by one of skill in the art, many variations are possible and within the scope of this invention. For example, the fittings 10-17 can be made to any convenient size, from relatively small bench top type systems to large, industrial scale pumping systems. The sensors and related portions of the system described herein throughout can likewise be increased in size and/or capacity to provide appropriate measurement for systems of various sizes and performance capabilities.

In addition, with the low cost, the pressure sensor could be disposed of with the process tubing. This could make it a cleaner and safer process because remaining contents in the tubing would not leak as happens when a gauge or transmitter is removed.

While various embodiments of the present invention are specifically illustrated and/or described herein, it will be appreciated that modifications and variations of the present invention may be effected by those skilled in the art without departing from the spirit and intended scope of the invention.

The invention claimed is:

1. A universal sensor apparatus for in-line fluid measurement in a process application, the apparatus comprising:
    an integrally formed fitting body comprising:
        (i) an inlet port for in-line coupling to the process application;
        (ii) an outlet port opposite the inlet port;
        (iii) a tubular wall extending between the inlet port and the outlet port, the wall having an inner surface and an outer surface, the inner surface defining a fluid flow passage providing fluid communication between the inlet port and the outlet port;
        (iv) a sensor housing extending outwardly away from the outer surface, the sensor housing together with a portion of the outer surface of the tubular wall defining a housing interior;
        (v) the portion of the outer surface forming a recessed sensor seat within said housing interior, the recessed seat having a length dimension and a width dimension perpendicular to the length dimension, the length dimension being longer than the width dimension, the passage extends along an axis and wherein the length dimension is parallel to the axis along which the passage extends; and
        (vi) the tubular wall forming at least one probe aperture extending from the fluid passage to the sensor seat; and
    a sensor assembly seated within the seat and including a probe portion extending into the aperture, the probe portion including a sensing surface that is exposed to the passage.

2. The sensor apparatus of claim 1 wherein the sensing surface is substantially flush with the inner surface.

3. The sensor apparatus of claim 1 wherein the probe aperture is centrally located along the width dimension and is offset to one end of the length dimension.

4. The sensor apparatus of claim 3 wherein the outer surface of the tubular wall has a minimum diameter and wherein the width dimension of the seat is less than the minimum diameter.

5. The sensor apparatus of claim 3 wherein the seat forms a substantially flat surface that is parallel to the axis along which the passage extends and the sensor assembly abuts the flat surface.

6. The sensor apparatus of claim 5 wherein the flat surface formed by the seat surrounds the probe aperture.

7. The sensor apparatus of claim 6 wherein the sensor assembly includes a flat surface that abuts the flat surface formed by the seat.

8. The sensor apparatus of claim 1 wherein the probe portion includes a length dimension that is substantially equal to a thickness of the portion of the tubular wall that forms the probe aperture.

9. The sensor apparatus of claim 8 wherein the sensor assembly includes a flat surface and the probe portion includes an external wall that is substantially cylindrical and that extends perpendicular to the flat surface of the sensor assembly.

10. The sensor apparatus of claim 9 wherein the sensor assembly includes a Wheatstone bridge chip that generates a voltage indicative of fluid pressure within the passage.

11. The sensor apparatus of claim 10 wherein the chip is located outside the aperture.

12. The sensor apparatus of claim 10 wherein the portion of the wall that forms the probe aperture is less thick than adjacent portions of the tubular wall.

13. The sensor apparatus of claim 12 wherein the passage has a substantially uniform cross-sectional area.

14. The sensor apparatus of claim 13 wherein the passage is cylindrical and has a diameter within a range between 1/16th of an inch and an inch.

15. The sensor apparatus of claim 14 wherein the diameter is substantially 1 inch.

16. The sensor apparatus of claim 1 wherein the sensor housing includes a substantially continuous wall that circumscribes the housing interior.

17. The sensor apparatus of claim 16 wherein the substantially continuous wall includes a substantially cylindrical internal surface that defines the housing interior along with said portion of the outer surface of the tubular wall.

18. The sensor apparatus of claim 17 wherein the portion of the outer surface that defines the housing interior along with the housing is substantially circular and has a diameter dimension and the length dimension is less than the diameter dimension.

19. The sensor apparatus of claim 18 wherein the passage is tubular and has a substantially continuous cross section between the inlet and outlet ports.

20. The sensor apparatus of claim 1 wherein the passage extends along a first axis, the housing has an open distal end, the apparatus further including a cap that seals the open distal end, the cap forming an opening that extends along a second axis that is perpendicular to the first axis, wiring secured to the sensor assembly in the housing interior and extending through the opening to a coupling element at a distal end of the wiring.

21. A universal sensor apparatus for in-line fluid measurement in a process application, the apparatus comprising:
    an integrally formed fitting body comprising:
        (i) an inlet port for in-line coupling to the process application;
        (ii) an outlet port opposite the inlet port;

(iii) a tubular wall extending between the inlet port and the outlet port, the wall having an inner surface and an outer surface, the inner surface defining a fluid flow passage providing fluid communication between the inlet port and the outlet port;

(iv) a sensor housing extending outwardly away from the outer surface, the sensor housing together with a portion of the outer surface of the tubular wall defining a housing interior;

(v) the portion of the outer surface forming a recessed sensor seat within said housing interior; and (vi) the tubular wall forming at least one probe aperture extending from the fluid passage to the sensor seat; and a sensor assembly seated within the seat and including a probe portion extending into the aperture, the probe portion including a sensing surface that is exposed to the passage, the sensor assembly is ultrasonically welded to the fitting body.

22. The sensor apparatus of claim 21 wherein the sensor assembly is hermetically sealed to the fitting body.

23. The sensor apparatus of claim 22 wherein the seat includes a substantially flat surface that surrounds the probe aperture within the recess, the sensor assembly includes a flat surface that abuts the flat surface that surrounds the probe opening, and wherein the hermetic seal is formed between the flat surface formed by the seat and the flat surface formed by the sensor assembly.

24. A universal sensor apparatus for in-line fluid measurement in a process application, the apparatus comprising:

a sensor assembly including a first surface and a probe portion, the first surface having a first length dimension, the probe portion extending from the first surface along a trajectory that is substantially perpendicular to the first length dimension;

an integrally formed fitting body comprising:

(i) an inlet port for in-line coupling to the process application;

(ii) an outlet port opposite the inlet port;

(iii) a wall extending between the inlet port and the outlet port, the wall having an inner surface and an outer surface, the inner surface defining a tubular fluid flow passage providing fluid communication between the inlet port and the outlet port, the fluid flow passage having a second length dimension between the inlet port and the outlet port, portions of the outer surface at different locations along the second length dimension defining different diameter dimensions, a first portion of the wall located to one side of the fluid flow passage and along a central portion of the first length dimension forming a recessed sensor seat having a width dimension and a third length dimension, the width dimension smaller than the third length dimension, the wall further forming at least one probe aperture extending from the fluid passage to the sensor seat;

wherein, the sensor assembly is received at least in part within the recessed sensor seat with the first surface abutting the sensor seat with the first length dimension aligned with the second length dimension and the second length dimension aligned with the third length dimension and with the probe portion extending into the aperture to a distal end proximate the fluid flow passage.

25. The sensor apparatus of claim 24 wherein the probe aperture is centrally located along width dimension and is offset to one end of the third length dimension.

26. The sensor apparatus of claim 25 wherein the fitting body further includes a sensor housing located entirely to one side of the fluid flow passage, the sensor housing forming an inner chamber adjacent the sensor seat.

27. The sensor apparatus of claim 26 wherein the housing includes a continuous cylindrical housing wall having a substantially cylindrical internal surface that defines the inner chamber.

28. The sensor apparatus of claim 27 wherein the sensor assembly extends at least in part outside the recessed sensor seat and into the inner chamber.

29. The sensor apparatus of claim 26 wherein the passage extends along a first axis, the housing has an open distal end, the apparatus further including a cap that seals the open distal end, the cap forming an opening that extends along a second axis that is perpendicular to the first axis, wiring secured to the sensor assembly in the housing interior and extending through the opening to a coupling element at a distal end of the wiring.

30. The sensor apparatus of claim 24 wherein the sensor assembly includes a sensing surface at its distal end and wherein the sensing surface is substantially flush with the inner surface.

31. The sensor apparatus of claim 24 wherein the probe portion includes a length dimension that is substantially equal to a thickness of the portion of the wall that forms the probe aperture.

32. The sensor apparatus of claim 31 wherein the sensor assembly includes a flat surface and the probe portion includes an external wall that is substantially cylindrical and that extends perpendicular to the flat surface of the sensor assembly.

33. The sensor apparatus of claim 32 wherein the sensor assembly includes a Wheatstone bridge chip that generates a voltage indicative of fluid pressure within the passage.

34. The sensor apparatus of claim 33 wherein the chip is located outside the aperture.

35. The sensor apparatus of claim 33 wherein the portion of the wall that forms the probe aperture is less thick than adjacent portions of the wall.

36. The sensor apparatus of claim 24 wherein the passage is tubular and has a substantially continuous and uniform cross section between the inlet and outlet ports.

37. The sensor apparatus of claim 36 wherein the passage is cylindrical and has a diameter within a range between 1/16th of an inch and an inch.

38. The sensor apparatus of claim 24 wherein the sensor assembly is ultrasonically welded to the fitting body.

39. The sensor apparatus of claim 38 wherein the sensor assembly is hermetically sealed to the fitting body.

* * * * *

UNITED STATES PATENT AND TRADEMARK OFFICE
CERTIFICATE OF CORRECTION

PATENT NO. : 11,892,323 B1
APPLICATION NO. : 18/222929
DATED : February 6, 2024
INVENTOR(S) : James F. Furey et al.

Page 1 of 1

It is certified that error appears in the above-identified patent and that said Letters Patent is hereby corrected as shown below:

In the Claims

Column 12, Claim 25, Line 7, "along width" should be --along the width--.

Signed and Sealed this
Sixth Day of January, 2026

John A. Squires
*Director of the United States Patent and Trademark Office*